(12) United States Patent
Hawinkel et al.

(10) Patent No.: US 11,160,022 B2
(45) Date of Patent: Oct. 26, 2021

(54) CONTROLLER, DEVICE AND METHOD FOR CONTROLLING BATTERY-POWERED DEVICE

(71) Applicant: Nokia Technologies Oy, Espoo (FI)

(72) Inventors: Chris Hawinkel, Antwerp (BE); Stefan Custers, Antwerp (BE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/499,758

(22) PCT Filed: Apr. 6, 2017

(86) PCT No.: PCT/EP2017/058219
§ 371 (c)(1),
(2) Date: Sep. 30, 2019

(87) PCT Pub. No.: WO2018/184681
PCT Pub. Date: Oct. 11, 2018

(65) Prior Publication Data
US 2021/0105717 A1    Apr. 8, 2021

(51) Int. Cl.
*H04W 52/02* (2009.01)
*H04W 84/12* (2009.01)

(52) U.S. Cl.
CPC ... *H04W 52/0229* (2013.01); *H04W 52/0258* (2013.01); *H04W 84/12* (2013.01)

(58) Field of Classification Search
CPC ......... H04W 52/0229; H04W 52/0258; H04W 84/12
See application file for complete search history.

(56) References Cited

U.S. PATENT DOCUMENTS

| 7,715,334 | B2* | 5/2010 | Harsch | H04L 69/163 370/311 |
| 9,351,254 | B2* | 5/2016 | Backholm | H04W 52/0251 |
| 2012/0331323 | A1 | 12/2012 | Choi et al. | |
| 2013/0258945 | A1* | 10/2013 | Tomita | H04W 76/25 370/328 |
| 2016/0100361 | A1 | 4/2016 | Zheng et al. | |
| 2018/0132177 | A1* | 5/2018 | Gandhi | H04W 52/0235 |

OTHER PUBLICATIONS

Written Opinion of the International Searching Authority and International Search Report for related International Patent Application No. PCT/EP2017/058219, dated Dec. 13, 2017, 8 pages.

* cited by examiner

*Primary Examiner* — Mohammad S Anwar
(74) *Attorney, Agent, or Firm* — Ditthavong, Steiner & Mlotkowski

(57) ABSTRACT

A controller for controlling a battery-powered device comprising a communication module configured for communicating with a server; the controller being configured for: obtaining at least one time condition indicated by a request received by the communication module from the server; determining a time schedule based on the obtained at least one time condition; transmitting at least one alive message to the server with the communication module according to the determined time schedule; and opening at least one reception window of the communication module according to the determined time schedule.

20 Claims, 9 Drawing Sheets

CONTROLLER, DEVICE AND METHOD FOR CONTROLLING BATTERY-POWERED DEVICE

CROSS-REFERENCES TO RELATED APPLICATIONS

This application claims priority from PCT Application Serial No. PCT/EP2017/058219, entitled "Controller, Device and Method For Controlling Battery-Powered Device," filed on Apr. 6, 2017, the contents of which are hereby incorporated herein in their entirety by this reference.

FIELD OF INVENTION

The field of the invention relates to controlling battery-powered devices. Particular embodiments relate to a controller for controlling a battery-powered device, a battery-powered device, a server, a method for controlling a battery-powered device, a method for controlling a server, and a computer program product.

BACKGROUND

Low Power Wide Area Networks (LPWAN) extend the reach of IoT (Internet of Things) to remotely located objects. They enable wireless transmission of sensor data over relatively large distances (e.g. thousands of metres), at a relatively low bitrate (e.g. a few kbps), and at a very low power level (e.g. a few milliwatts), in order to limit sensor battery power consumption. Various LPWAN technologies have been proposed, both in licensed and unlicensed spectrum bands. Some of the unlicensed LPWAN technologies operate in the sub-GHz spectrum, which is favourable for crossing large distances and for good penetration through walls, while allowing very low power consumption.

LoRa®/LoRaWAN™ is one of the main LPWAN technologies, driven by a large community, by a strong market momentum, and by the ability to combine low cost with long reach and low power. LoRaWAN™ is the MAC (Media Access Control) layer used on top of the LoRa® physical layer. LoRa® is a proprietary modulation format. Particular LoRa® chips use a modulation technique called chirp spread spectrum (CSS) to make up the physical (PHY) layer of the technology stack. LoRaWAN™ is an open-standard that defines the communication protocol for LPWAN technology based on a LoRa® chip. LoRaWAN™ defines the MAC in the data link layer and is maintained by the LoRa Alliance™. In the present specification, the term "LPWAN" may be construed as "any type of low power wide area network technology, including but not limited to LoRa®/LoRaWAN™".

LPWAN end devices typically provide either long battery lifetime, but extremely limited interactivity/accessibility, by opening reception windows only after they have transmitted a message, or high interactivity/accessibility at the cost of greatly reduced battery lifetime, by continuously having a reception window open.

SUMMARY

An object of embodiments of the present invention is to allow the network operator to control battery-powered devices such that they can receive communication, while limiting their energy consumption.

According to a first aspect of the present invention there is provided a controller for controlling a battery-powered device comprising a communication module configured for communicating with a server. The controller may be configured for: obtaining at least one time condition indicated by a request received by the communication module from the server; determining a time schedule based on the obtained at least one time condition; transmitting at least one alive message to the server with the communication module according to the determine time schedule; and opening at least one reception window of the communication module according to the determined time schedule.

Embodiments of the present invention are based inter alia on the insight that allowing the server to send a request indicating at least one time condition and opening at least one reception window according to a time schedule determined based on the indicated at least one time condition provides better interactivity (since the device will have reception windows open according to the time schedule), with a limited impact on battery power consumption (because the at least one reception window is opened according to the time schedule rather than permanently). By transmitting the at least one alive message, the server can be informed when it may send any messages that it wants to send to the device. In this manner, even if a timer or clock in the device is not very accurate, the device and server can synchronise when to send and receive any messages that the server may wish to send.

In other words, the controller gives increased accessibility of the device during a well defined timeframe, while limiting the impact on the battery power consumption. This is beneficial both for the application layer and for the network management: the customer application at the back-end gets more opportunity to reach the device e.g. for specific maintenance actions or extra data collection. The server can more frequently access the device in case of conditions that require special attention.

It may be noted that the entity that is denoted here with "server" may correspond in typical LPWAN configurations to the "network server", and that any "application server" in typical LPWAN configurations is typically a different entity than this entity, because the network layer and the application layer are typically kept separate from each other for reasons of organisation.

In an embodiment, the controller may be configured for controlling at least part of the device to sleep during at least one period separate from the opened at least one reception window, based on the determined time schedule. In this manner, power consumption outside of the opened reception window or reception windows may be limited.

In another embodiment, the controller may be configured for controlling the communication module for transmitting to the server a response to the received request, the response indicating confirmation or rejection of the received request. Furthermore, the controller may be configured for determining the time schedule and opening the at least one reception window if the response indicates confirmation of the received request. In this manner, the server may ensure that the device will receive communication.

In a preferred embodiment, the controller may be configured for opening each reception window of the at least one reception window as a direct consequence of transmitting each alive message of the at least one alive message. In this manner, pre-existing protocol behaviour—wherein a reception window is automatically opened after transmission of a message—can be re-used.

In another possible embodiment, the at least one alive message may comprise an empty packet. In a specific exemplary embodiment, the at least one alive message may comprise an empty packet of type Unconfirmed Data. In this manner, overhead can be limited.

In a further developed embodiment, the at least one time condition may comprise at least one of the following: a number of times to open a reception window; and a time interval to wait to open each reception window. In this manner, the time schedule can be readily defined in a simple manner. Note that the controller can open as the at least one reception window a number of reception windows corresponding with this number of times.

In another embodiment, the at least one time condition may comprise both the number of times and the time interval. Furthermore, the controller may be configured for determining the time schedule as a linear repetition of the time interval for the number of times. In this manner, computational requirements for the device can be limited.

In a specifically further developed embodiment, the controller may be configured for controlling the device for, if the number of times is zero, halting further opening of reception windows of the at least one reception window. In this manner, needless power consumption can be reduced.

In another possible embodiment, the controller may be configured for obtaining a time delay for delaying opening the at least one reception window, from a or the request received by the communication module from the server, or for obtaining the time delay from a memory storage configured for storing the time delay. Furthermore, the controller may be configured for delaying opening the at least one reception window according to the obtained time delay. In this manner, better timing control can be achieved.

According to another aspect of the present invention, there is provided a device comprising a battery arranged for powering the device; a communication module configured for communicating with a server and for receiving from the server a request indicating at least one time condition; and a controller according to any one of the above-disclosed embodiments.

It will be understood by the skilled person that the features and advantages disclosed hereinabove with respect to various embodiments of the controller may also apply, mutatis mutandis, to various embodiments of the device.

According to another aspect of the present invention, there is provided a server comprising a communication module configured for communicating with a device according to any one of the above-disclosed embodiments; and a controller configured for controlling the server for transmitting a request to the device, with the communication module, the request indicating at least one time condition, such that the device will, as a response to the received request, open at least one reception window according to a time schedule based on the at least one time condition; and for receiving at least one alive message from the device, with the communication module.

It will be understood by the skilled person that the features and advantages disclosed hereinabove with respect to various embodiments of the controller for controlling a battery-powered device may also apply, mutatis mutandis, to various embodiments of the server.

Moreover, the skilled person will appreciate that the controller of embodiments of the server may instead be provided separately from the communication module of the server.

In particular, by being configured for receiving the at least one alive message, the server may be informed by the device of the times when the server may actually send any messages that it may wish to send to the device. In this manner, even if a timer or clock in the device is not very accurate, the device and server can synchronise when to send and receive any messages that the server may wish to send.

In an embodiment, the controller may be configured for controlling the server for: determining at least one signal parameter of the at least one alive message, in order to monitor radio network quality of a network hosting the device. In this manner, the server can monitor radio network quality of the network hosting the device without imposing further requirements.

In another embodiment, the controller may be configured for controlling the server for receiving a response from the device to the transmitted request, the response indicating confirmation or rejection of the received request. In this manner, the server can ensure that the device will receive communication.

In another possible embodiment, the controller may be configured for controlling the server for: transmitting a time delay for delaying opening the at least one reception window, as part of the transmitted request or as a request sent separately to the device. In this manner, better timing control can be achieved.

According to another aspect of the present invention, there is provided a system, comprising a device according to any one of the above-disclosed embodiments, and a server according to any one of the above-disclosed embodiments.

It will be understood by the skilled person that the features and advantages disclosed hereinabove with respect to various embodiments of the controller, device and server may also apply, mutatis mutandis, to various embodiments of the system.

According to another aspect of the present invention, there is provided a method for controlling a battery-powered device comprising a communication module configured for communicating with a server. The method may comprise: obtaining at least one time condition indicated by a request received by the communication module from the server; determining a time schedule based on the obtained at least one time condition; transmitting at least one alive message to the server with the communication module according to the determined time schedule; and opening at least one reception window of the communication module according to the determined time schedule.

It will be understood by the skilled person that the features and advantages disclosed hereinabove with respect to various embodiments of the controller for controlling a battery-powered device may also apply, mutatis mutandis, to various embodiments of this method.

In particular, the method may comprise a corresponding feature or corresponding features to those of the controller embodiments.

According to another aspect of the present invention, there is provided a method for operating a battery-powered device comprising a communication module configured for communication with a server. The method may comprise: receiving a request from the server with the communication module, the request indicating at least one time condition; obtaining the at least one time condition indicated by the received request; determining a time schedule based on the obtained at least one time condition; transmitting at least one alive message to the server with the communication module according to the determined time schedule; and opening at least one reception window of the communication module according to the determined time schedule.

It will be understood by the skilled person that the features and advantages disclosed hereinabove with respect to various embodiments of the controller for controlling a battery-powered device may also apply, mutatis mutandis, to various embodiments of this method.

According to another aspect of the present invention, there is provided a method for controlling a server comprising a communication module configured for communicating with a device according to any one of the above-disclosed embodiments. The method may comprise transmitting a request to the device, with the communication module, the request indicating at least one time condition, such that the device will, as a response to the received request, open at least one reception window according to a time schedule based on the at least one time condition; and receiving at least one alive message from the device, with the communication module.

It will be understood by the skilled person that the features and advantages disclosed hereinabove with respect to various embodiments of the controller for controlling a battery-powered device may also apply, mutatis mutandis, to various embodiments of this method.

In particular, the method may comprise a corresponding feature or corresponding features to those of the controller embodiments.

According to yet another aspect of the present invention, there is provided a computer program product comprising a computer-executable program of instructions for performing, when executed on a computer, the steps of the method of any one of the method embodiments disclosed above.

It will be understood by the skilled person that the features and advantages disclosed hereinabove with respect to embodiments of the methods may also apply, mutatis mutandis, to embodiments of the computer program product.

According to another aspect of the present invention, there is provided a controller for controlling a battery-powered device comprising a communication module configured for communicating with a server. The controller may comprise obtaining means, determining means, transmission control means, and reception control means. The obtaining means may be configured for obtaining at least one time condition indicated by a request received by the communication module from the server. The determining means may be configured for determining a time schedule based on the obtained at least one time condition. The transmission control means may be configured for controlling the communication module for transmitting at least one alive message to the server according to the determined time schedule. The reception control means may be configured for opening at least one reception window of the communication module according to the determined time schedule.

It will be understood by the skilled person that the features and advantages disclosed hereinabove with respect to various embodiments of the other controller disclosed hereinabove may also apply, mutatis mutandis, to various embodiments of this controller.

In an embodiment, the controller may comprise sleep control means configured for controlling at least part of the device to sleep during at least one period separate from the opened at least one reception window, based on the determined time schedule.

In an embodiment, the transmission control means may further be configured for controlling the communication module for transmitting to the server a response to the received request, the response indicating confirmation or rejection of the received request. The determining means and the reception control means may respectively be configured for determining the time schedule and opening the at least one reception window if the response indicates confirmation of the received request.

In an embodiment, the reception control means may be configured for opening each reception window of the at least one reception window as a direct consequence of transmitting each alive message of the at least one alive message.

In an embodiment, the at least one alive message may comprise an empty packet, preferably an empty packet of type Unconfirmed Data.

In an embodiment, the at least one time condition may comprise at least one of the following: a number of times to open a reception window; and a time interval to wait to open each reception window.

In an embodiment, the at least one time condition may comprise both the number of times and the time interval, and the determining means may further be configured for determining the time schedule as a linear repetition of the time interval for the number of times.

In a specific embodiment, the controller may comprise halting control means configured for controlling the device for, if the number of times is zero, halting further opening of reception windows of the at least one reception window.

In an embodiment, the obtaining means may further be configured for obtaining a time delay for delaying opening the at least one reception window, from a or the request received by the communication module from the server, or for obtaining the time delay from a memory storage configured for storing the time delay. Moreover, the controller may comprise delay control means configured for delaying opening the at least one reception window according to the obtained time delay.

According to another aspect of the present invention, there is provided a device comprising a battery arranged for powering the device; a communication module configured for communicating with a server and for receiving from the server a request indicating at least one time condition; and a controller according to any one of the above-disclosed embodiments.

It will be understood by the skilled person that the features and advantages disclosed hereinabove with respect to various embodiments of the controller may also apply, mutatis mutandis, to various embodiments of the device.

In an embodiment of any one of the devices according to the present disclosure, the device may be configured to operate as a sensor. In a specific embodiment, the device may additionally or alternatively be configured to operate as an actuator. In another embodiment, the device may be wearable. In yet another embodiment, the device may additionally or alternatively be implantable.

In an embodiment of any one of the devices according to the present disclosure, the device may be configured to operate as a wireless sensor node. This may also be called a "mote". In a further developed embodiment, the communication module may comprise a radio-frequency antenna. In another further developed embodiment, the communication module may additionally or alternatively comprise means for optical communication, such as laser or infrared communication.

According to another aspect of the present invention, there is provided a server comprising a communication module configured for communicating with a device according to any one of the above-disclosed embodiments; and a controller. The controller may comprise transmission control means configured for controlling the server for transmitting a request to the device, with the communication module, the request indicating at least one time condition, such that the device will, as a response to the received request, open at least one reception window according to a time schedule based on the at least one time condition; and reception control means configured for receiving at least one alive message from the device, with the communication module.

It will be understood by the skilled person that the features and advantages disclosed hereinabove with respect to various embodiments of the controller for controlling a battery-powered device may also apply, mutatis mutandis, to various embodiments of the server.

Moreover, the skilled person will appreciate that the controller of embodiments of the server may instead be provided separately from the communication module of the server.

In a particular embodiment, the controller may comprise signal monitoring means configured for determining at least one signal parameter of the at least one alive message, in order to monitor radio network quality of a network hosting the device Further aspects of the present invention are described by the dependent claims. The features from the dependent claims, features of any of the independent claims and any features of other dependent claims may be combined as considered appropriate to the person of ordinary skill in the art, and not only in the particular combinations as defined by the claims.

Although the present specification may preferentially use terminology related to LPWAN and LoRa®/LoRaWAN™ in particular, it is to be understood that embodiments of the present invention are not limited to these particular technologies, but may be implemented with other existing and foreseeable technologies that are substantially similar.

BRIEF DESCRIPTION OF THE FIGURES

The accompanying drawings are used to illustrate presently preferred non-limiting exemplary embodiments of devices of the present invention. The above and other advantages of the features and objects of the present invention will become more apparent and the present invention will be better understood from the following detailed description when read in conjunction with the accompanying drawings, in which.

DESCRIPTION OF EMBODIMENTS

Figure 1:
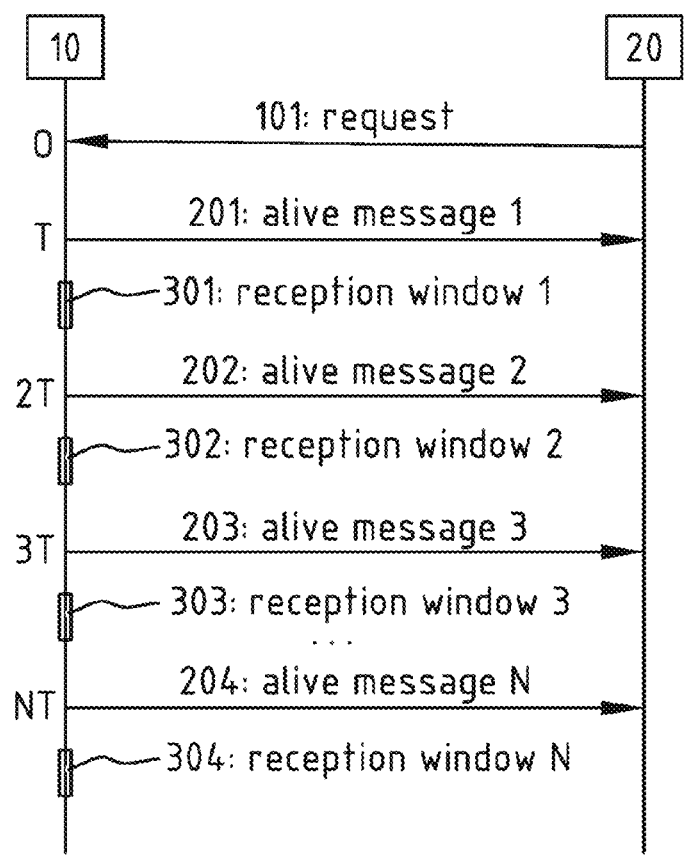
FIG. 1 schematically illustrates an example of communication between an embodiment of a device according to the present invention and a server according to the present invention.

The LPWAN enables communication between end devices and a network server over two subnetworks: the wireless part between end device and gateway, and the backhaul part between gateway and network server. Since the wireless communication takes place in non-licensed spectrum, regulation limits the Time-on-Air of both the end devices (sensors) and gateways.

In order to support a broad variety of contexts and use cases in terms of power requirements and bidirectional communication needs (interactivity), LPWAN supports three classes of end devices:

Class A end devices restrict downstream communication to two short downstream reception sub-windows, RX1 and RX2, immediately after each upstream transmission. After expiry of RX2, the end device returns to sleep mode, and cannot be reached anymore until after its next upstream transmission. This severely limits downstream communication liberty. While significantly limiting bidirectional communication liberty (especially downstream), such behaviour warrants a conservative power consumption pattern. This may yield battery lifetime of a decade order of magnitude). For a large class of sensor applications such a communication pattern is fine, since for the majority of telemetry applications the information flow is unidirectional and upstream from the device. Class A performs very well from a power consumption perspective, but very badly from an interactivity (downstream communication liberty) perspective. Assuming that the IoT (Internet of Things) is about both monitoring and controlling our physical world, it is an insight of the inventors that there should also be devices that provide complementary predictable downstream communication.

Class C end devices also open two reception sub-windows, but keep RX2 permanently open until the next packet to be transmitted. In other words class C can be reached from the network server nearly all the time, which allows highly interactive communication with the end device. The disadvantage is that the permanently open RX2 window continually consumes power, which makes class C mode unsuitable for battery-powered operation, such that external power provision is required.

Class B end devices combine a better interactivity (compared with class A) with a power consumption that is moderate enough to support battery-operation for a limited number of scenarios. Class B operation is based on the periodic reception of beacons from the gateway and the opening by the end device of one or more ping slots during the beacon periods. The network server can use these ping slots to address the end device, which allows a fair degree of interaction with the end device. Class B is currently still in an experimental state, awaiting final standardization in LPWAN. Battery lifetime is estimated to be typically in the order of 4 to 6 months.

The vast majority of currently deployed LPWAN end devices are battery-powered class A devices. This implies that these devices can only be reached by the network server immediately after the end device has sent a packet. In between packet transmissions, class A end devices are typically unreachable by the network server for hours. Since the application in the backend relies on the underlying LPWAN to interact with the application in the end device, this 'unreachable' status applies also to the IoT application itself.

This limited accessibility of class A end devices can be a problem for two reasons:

First, it may prevent implementation of a number of application options that require a higher level of interactivity, even if just for a limited duration, to deal with an exceptional situation (e.g. exceptionally high water level, requiring more extensive monitoring for a limited time).

Second, it may limit network server access to the end device for network operational purposes (e.g. monitoring of degradation of radio network quality).

Within the framework of LPWAN technologies such as LoRa®/LoRaWAN™, one solution to operate battery-powered devices in a more interactive way, would be to make use of class B end devices. In many cases this is not possible since the battery power consumption is prohibitively high. A class A end device, with a typical transmission rate of one packet every few hours can typically operate at least 10 years with the same battery. Simulations for class B end devices, assuming a similar traffic rate, show that the battery would typically last for only 3-6 months. The main reason for this is that the regular opening of receive windows to receive beacons and for ping slots is a continuously ongoing power-consuming process, even if the need for increased interactivity exists only for a fraction of the time. Another drawback of this option is that not all end devices are class B capable.

Another solution could be imagined at the application layer, whereby the application at the end device is programmed to send dummy traffic to open receive windows. This has however several disadvantages: a) it puts an overhead on the application layer in the end device which is designed to operate with a limited use of resources, b) it does not allow the network operator to take control of this operation.

Another solution would be to use the recently proposed "Temporary class A/C mode switching", which comprises putting a class A device at a certain moment in class C, and switching it back to class A mode as soon as the specific circumstances have changed. Whereas this solution is certainly interesting when intensive interaction or very low latency are required during a short time period, it can only be used sporadically since class C operation implies a continuously open receive window, which rapidly drains the battery. It is not suitable if intensified monitoring or interaction is required over a longer period of time.

Embodiments of the present invention therefore may aim to give the network operator the possibility to implement an increased downstream accessibility to a given end device (e.g. a class A end device of LPWAN technologies such as LoRa®/LoRaWAN™) during a well-defined period of time, while limiting the power consumption for this. For this purpose, a network server may temporarily or permanently adapt operation of the end device, such that the end device may open a reception window every T minutes for number of times N. In a particularly preferred embodiment, this may be done by sending every T minutes an alive message (e.g. an empty Unconfirmed Data packet) to the network server, in order to have the respective reception window shortly opened immediately thereafter. During the reception window, the network server may then send a message to the end device, if it so wishes. This may be repeated number of times N, or until the operations is terminated by the operator. Time interval T and number of times N may e.g. be configurable MAC command parameters. After T time, the end device may e.g. start sending N times an alive message with an interval of T minutes and with zero length frame payload, unless the sequence is prematurely terminated by a new command. Assuming this would be applied to an end device on a frequency base of once a week during 2 hours (T=2, N=60), this may reduce the battery lifetime with only around 15%.

FIG. 1 schematically illustrates an example of communication between an embodiment of a device according to the present invention and a server according to the present invention. The figure shows device 10 and server 20, e.g. as further described with reference to FIG. 6, both with a time line extending downward from them. It will be understood that the time line is schematic, and not intended to limit the specific timing of either device 10 or server 20. Device 10 may comprise a controller. e.g. controller 11 of FIG. 6, which may be configured for obtaining at least one time condition indicated by a request 101 received by a communication module (e.g. communication module 12) from server 20; for determining a time schedule based on the obtained at least one time condition; and for opening at least one reception window 301-304 of communication module 12 according to the determined time schedule—as will be discussed below.

Although this figure shows device 10 and server 20 together, it is to be understood that they can alternatively be considered separately from each other. Furthermore, device 10 may also be called an "end device", and server 20 may also be called a "network server". Moreover, it is to be understood that the present figure abstracts the communication link between device 10 and server 20, and that zero, one or more intermediate network communication nodes (not shown) may be present between device 10 and server 20—such intermediate network communication nodes may include entities that may be called "gateways" or "concentrators", and may optionally include other entities in the WAN between such a "gateway" and server 20.

Server 20 may transmit request 101 to device 10, via a communication link coupling them (as will be explained further with reference to FIG. 6. The transmission may be direct or indirect, e.g. via one or more gateways.

Upon reception of request 101 at device 10, or shortly thereafter, device 10 may commence a timer. This is shown in the figure by a 0 on the time line of device 10.

Request 101 may indicate at least one time condition, e.g. a number of times N and a time interval T. This is further explained with reference to FIG. 5A.

Device 10 may determine a time schedule based on the at least one time condition.

In this example, the time schedule may be a linear repetition of the time interval T for N number of times—or in other words, after a first occurrence, for N−1 times, each occurrence may happen T time after the previous occurrence, to arrive at N occurrences. Nevertheless, it will be appreciated by the skilled person that other types of time schedules than a linear time schedule may instead be used—however, a linear time schedule is easy to determine, which may save power expenditure of device 10 compared to different, more complicated types of time schedules.

In this figure, the occurrences are indicated on the time line of device 10, respectively as 'T', "2T", "3T", and so on (indicated with an ellipsis sign " . . . "), until "NT", to arrive at N occurrences. It will be understood that, if N is 1, only one such occurrence will happen.

At or around time T, device 10 may transmit alive message 201 to server 20, via the same communication link as was used for receiving request 101 or via another return path to server 20. By transmitting alive message 201 to server 20, server 20 may be informed of the availability of device 10. In particular, server 20 may thus be synchronised with device 10 to know the time when it may send any message that server 20 may wish to send to device 10. This advantageously improves availability of device 10 even if device 10 does not possess a sufficiently accurate clock.

Shortly after time T, device 10 may open reception window 301. Reception window 301 may be one singular reception window, or may comprise multiple distinct reception sub-windows—in the present specification, for either case the terminology "a or one reception window" may be used, without limitation. In a preferred embodiment, each reception window of reception windows 301-304 may comprise two distinct reception sub-windows, also called "RX1" and "RX2" respectively.

At or around time 2T, i.e. when time interval T has elapsed after time T, device 10 may transmit alive message 202 to server 20, analogously to alive message 201.

Shortly after time 2T, device 10 may open reception window 302, analogously to reception window 301.

At or around time 3T, i.e. when time interval T has elapsed after time 2T, device 10 may transmit alive message 203 to server 20, analogously to alive messages 201 and 202.

Shortly after time 3T, device 10 may open reception window 303, analogously to reception windows 301 and 302.

This may be repeated, until at or around time NT, i.e. when time interval T has elapsed after the previous time occurrence (N−1)T, when device 10 may transmit alive message 204 to server 20, analogously to alive messages 201-203.

Shortly after time NT, device 10 may open reception window 304, analogously to reception windows 301-303.

In this manner, reception windows 1-N may be opened by device 10, to allow reception by device 10 of messages (not shown) sent by server 20 during those reception windows 1-N. In other words, by ensuring that request 101 indicates the right time conditions, server 20 may ensure that it can transmit messages to device 10 over some course of time, thereby ensuring better interactivity of device 10. Moreover, because device 10 opens the reception windows 1-N only at specific times, it may save on energy consumption, and may thus have a longer battery power lifetime.

Figure 5A:
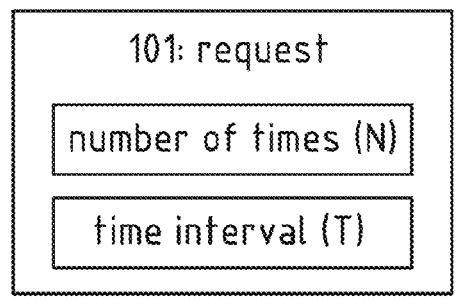
FIGS. 5A-5C schematically illustrate examples of a request, a response and another request, respectively, usable in respective embodiments of the present invention.

With reference to FIG. 5A, see below, further developed embodiments will be described which allow to refresh operations or to halt opening further reception windows.

Figure 2:
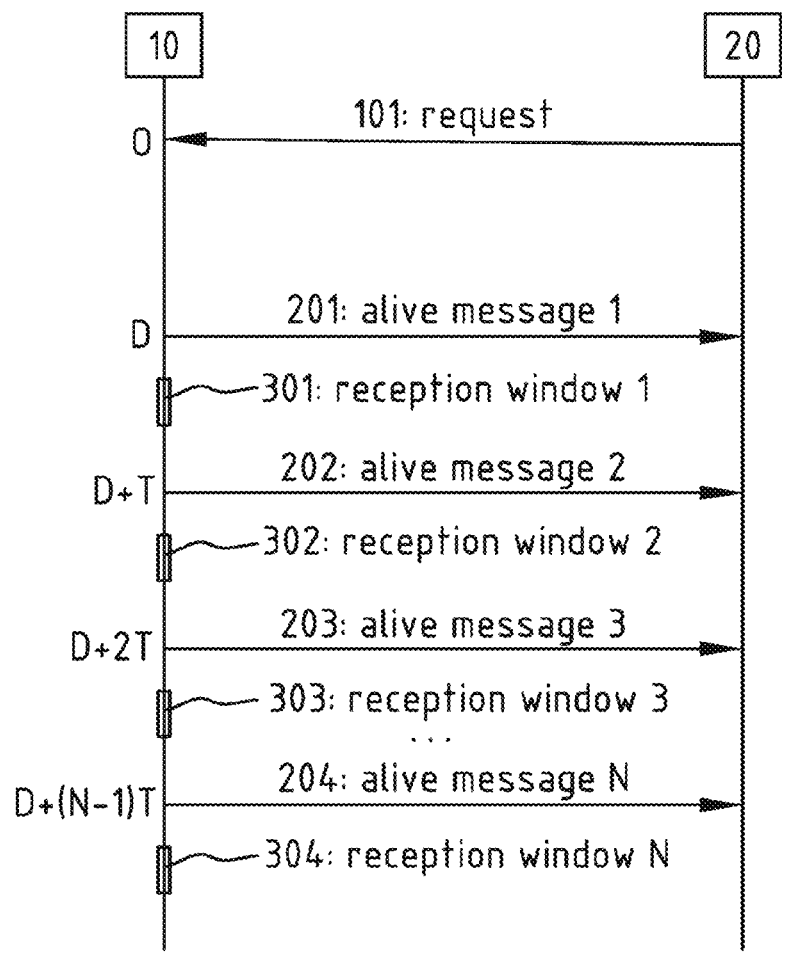
FIG. 2 schematically illustrates another example of communication between an embodiment of a device according to the present invention and a server according to the present invention, e.g. a further development of the example shown in FIG. 1.

FIG. 2 schematically illustrates another example of communication between an embodiment of a device according to the present invention and a server according to the present invention, e.g. a further development of the example shown in FIG. 1.

This example differs from the example of FIG. 1 in that, after reception of request 101, device 10 may delay opening reception windows 1-N for some time delay. In a particular embodiment, request 101 may indicate time delay D to delay the opening—this will be explained with reference to FIG. 5C. Alternatively, time delay D may be pre-stored by device 10, e.g. as part of a protocol that device 10 and server 20 agree to use, or as a configurable parameter that can be configured separately by server 20 or another controlling entity beforehand.

In this example, times T, 2T, 3T and NT then become D, D+T, D+2T and D+(N−1)T. However, it will be understood that these time values are meant only as examples to illustrate that opening reception windows 301-304 may be delayed for some time delay, and that their specific values are not meant to be limiting. In a particular development, device 10 may determine the time schedule such that, rather than transmitting alive messages 201-204, reception windows 301-304 are opened at or around times D, D+T, D+2T and D+(N−1)T. However, this particular development suffers from the drawback that it will be more difficult for device 10 and server 20 to synchronise precisely when any messages that server 20 may wish to send to device 10 may actually be sent by server 20 so as to be received by device 10 during one (or more) of the opened reception windows 301-304. Nevertheless, if device 10 and server 20 have a sufficiently accurate clock or timer, or if they have another way to mutually synchronise, this particular development may be advantageous. The skilled person will understand that these options and variants thereof may be contemplated on the basis of this disclosure.

Figure 3:
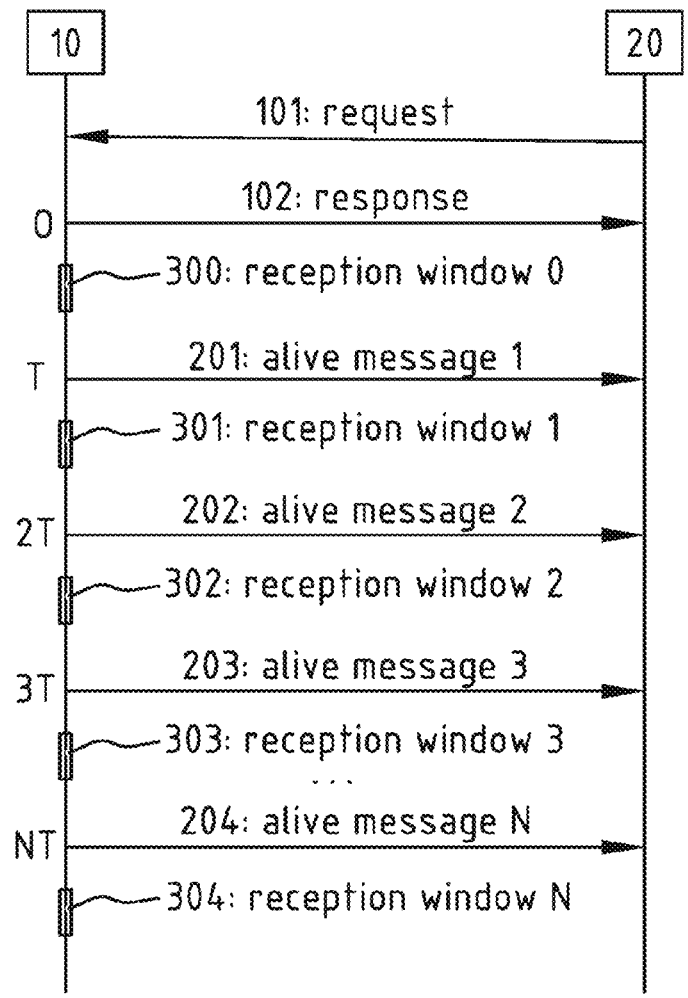
FIG. 3 schematically illustrates another example of communication between an embodiment of a device according to the present invention and a server according to the present invention, e.g. a further development of the example shown in FIG. 1.

FIG. 3 schematically illustrates another example of communication between an embodiment of a device according to the present invention and a server according to the present invention, e.g. a further development of the example shown in FIG. 1.

This example differs from the example of FIG. 1 in that, after reception of request 101, device 10 may respond by sending response 102 indicating confirmation or rejection of request 101—as will be explained with reference to FIG. 5B. Request 101 may for example be rejected if device 10 has insufficient power available in its battery, or for some other reason. For the purposes of this example, it may be assumed that response 102 was affirmative and indicated a confirmation of request 101. If response 102 would be negative and indicated a rejection of request 101, the skilled person will of course understand that further operation may be cancelled, and that no reception windows may be opened. Alternatively, it may be contemplated to have response 102 indicate a partial confirmation of request 101, for example by proposing one or more different time conditions (and/or, if applicable, a different time delay—for example as in the example shown in FIG. 4), for example to save power.

In this particular example, device 10 may open reception window 300 shortly after reception of request 101 and/or shortly after transmitting response 102. This may in particular be the case if the specific LPWAN technology provides that, after sending any kind of message, device 10 should open a reception window 300. This may then result in the opening of one extra reception window 300, for a total of N+1 reception windows 0-N. Nevertheless, it will be understood that opening this extra reception window 300 is optional, and does not necessarily detract from the remaining operations (i.e. that N+1 reception windows 0-N are opened in total). However, it may also be contemplated that server 20 may take this behaviour into account and may ensure that request 101 indicates as a time condition only N−1, such that a total of only N reception windows are opened.

Figure 4:
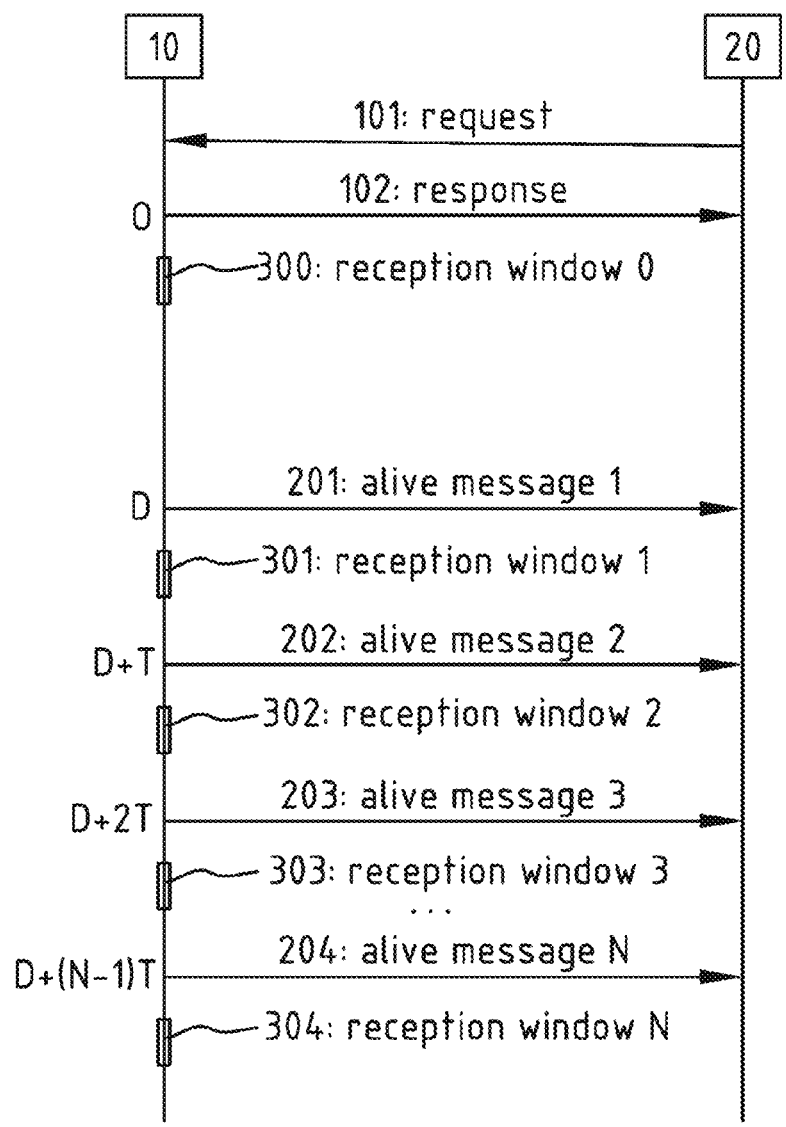
FIG. 4 schematically illustrates another example of communication between an embodiment of a device according to the present invention and a server according to the present invention, e.g. a further development of the examples shown in FIG. 1, 2 or 3.

FIG. 4 schematically illustrates another example of communication between an embodiment of a device according to the present invention and a server according to the present invention, e.g. a further development of the example shown in FIG. 1, 2 or 3.

This example straightforwardly combines the differences with respect to FIG. 1 of both FIG. 2 and FIG. 3. The considerations described above with reference to those figures apply here equally.

Figure 5B:
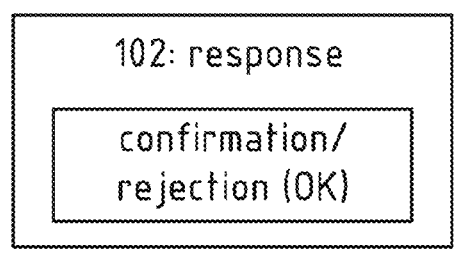
Figure 5C:
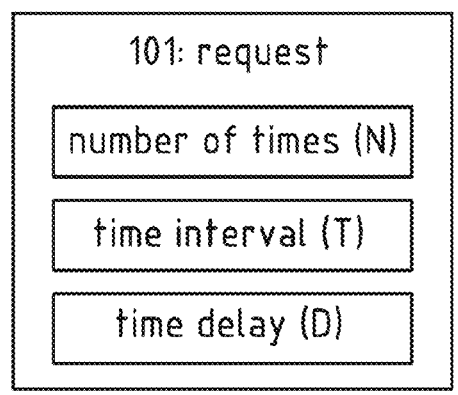

FIGS. 5A-5C schematically illustrate examples of request 101, response 101 and another request 101, respectively, as used in respective embodiments of the present invention.

FIG. 5A schematically illustrates request 101 indicating a number of times N to open a reception window, and a time interval T to wait to open each reception window. It will be understood that these specific time conditions are exemplary only, and that other time conditions may instead or additionally be used. Moreover, it is to be noted that request 101 may indicate only one of the number of times N and the time interval T, for example if the other time condition is part of a protocol that device 10 and server 20 may agree upon. Optionally, a time unit, such as minutes, hours, etc., to be used for determining the time schedule, may be included in request 101—otherwise, such a time unit to be used for determining the time schedule may be part of the protocol that device 10 and server 20 may agree upon.

In a practical embodiment, request 101 may for example comprise at least eleven bits, and in particular at least 8 bits indicating the number of times N and at least 3 bits indicating the time interval T. In this manner, the number of times N may range from 1 to 255, and the time interval T, if represented e.g. as $2^T$ minutes, may be 1, 2, 4, 8, ..., 128 minutes. It may moreover be considered to provide extra bits in request 101 that may be reserved for future use, to allow future compatibility for new commands or options.

In a further developed embodiment, if request 101 indicates that number of times N is 0 (zero), this may be used to halt further opening of reception windows of the at least one reception window. In another further developed embodiment, if device 10 receives a new request 101 from server 20, it may abort the ongoing sequence of reception windows to be opened, and may refresh the operation, by obtaining at least one new time condition indicated by the newly received request 101, by determining a new time schedule based on the newly obtained at least one time condition, and by opening at least one new reception window according to the newly determined time schedule.

FIG. 5B schematically illustrates response 102 indicating confirmation or rejection of request 101.

In a practical embodiment, response 102 may for example comprise at least one bit, which may for example indicate confirmation with 1 and rejection with 0. Here too, it may be considered to provide extra bits in response 102 that may be reserved for future use, to allow future compatibility for new commands or options.

FIG. 5C schematically illustrates request 101, indicating not only the number of times N and the time interval T as in FIG. 5A, but also a time delay D, to be used for delaying operations, as was described above with reference to FIGS. 2 and 4. In a practical embodiment, time delay D may for example be expressed in the same manner as time interval T, i.e. as at least 3 bits, so as to range over 1, 2, 3, 8, ..., 128 minutes if represented as $2^D$ minutes.

Figure 6:
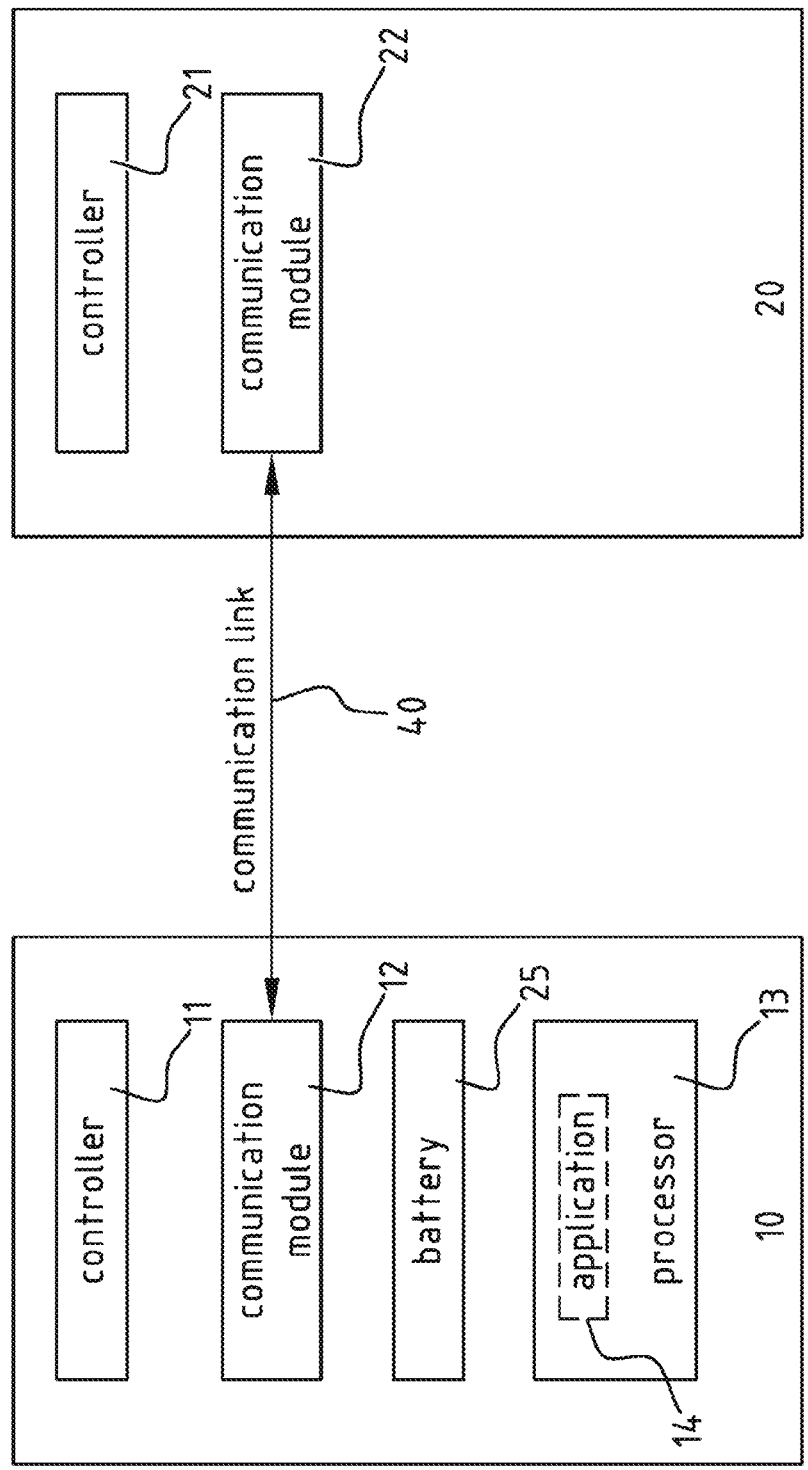
FIG. 6 schematically illustrates an embodiment of a system according to the present invention.

FIG. 6 schematically illustrates an embodiment of a system according to the present invention. The system may comprise device 10 and server 20. Device 10 may comprise battery 25 arranged for powering device 10, and communication module 12 configured for communicating with server 20, or in particular with communication module 22 of server 20, and for receiving from the server 20 (or in particular from its communication module 22) request 101 indicating at least one time condition, e.g. request 101 as illustrated with reference to FIG. 5A or 5C. Device 10 may further comprise controller 11 for controlling device 10, configured for obtaining at least one time condition indicated by request 101 received by communication module 12 from server 20; determining a time schedule based on the obtained at least one time condition; and opening at least one reception window of communication module 12 according to the determined time schedule. Server 20 may comprise communication module 22 configured for communication with device 10 (or in particular with communication module 12 of device 10), and may further comprise controller 21 configured for controlling server 20 for transmitting request 101 to device 10, with communication module 22, request 101 indicating at least one time condition, such that device 10 will, as a response to received request 101, open at least one reception window according to a time schedule based on the at least one time condition.

Communication modules 12 and 22 are coupled via communication link 40, which may be a direct connection or which may be an indirect connection, e.g. via one or more intermediate gateways or other network nodes (not shown). In a practical embodiment, communication link 40 may comprise a wireless fronthaul part (not shown) from device 10 up to such a gateway, and may comprise a wired backhaul part (not shown) from such a gateway up to server 20.

In this particular example, device 10 may also include processor 13, configured for executing application 14. In some embodiments, one or more application servers (not shown) may be provided, linked to server 20 (which server 20 may then in this context be called a "network server" specifically to more clearly distinguish between server 20 and such application servers), comprising a processor (not shown) configured for executing a server-side application which may correspond to application 14 in a client-server relationship. It is to be noted that, such a server-side application may alternatively (or even additionally, if it is distributed) be executed by server 20 if server 20 would combine both the network layer functionality and the application layer functionality, although this is typically not the case for reasons of organisations.

Figure 7:
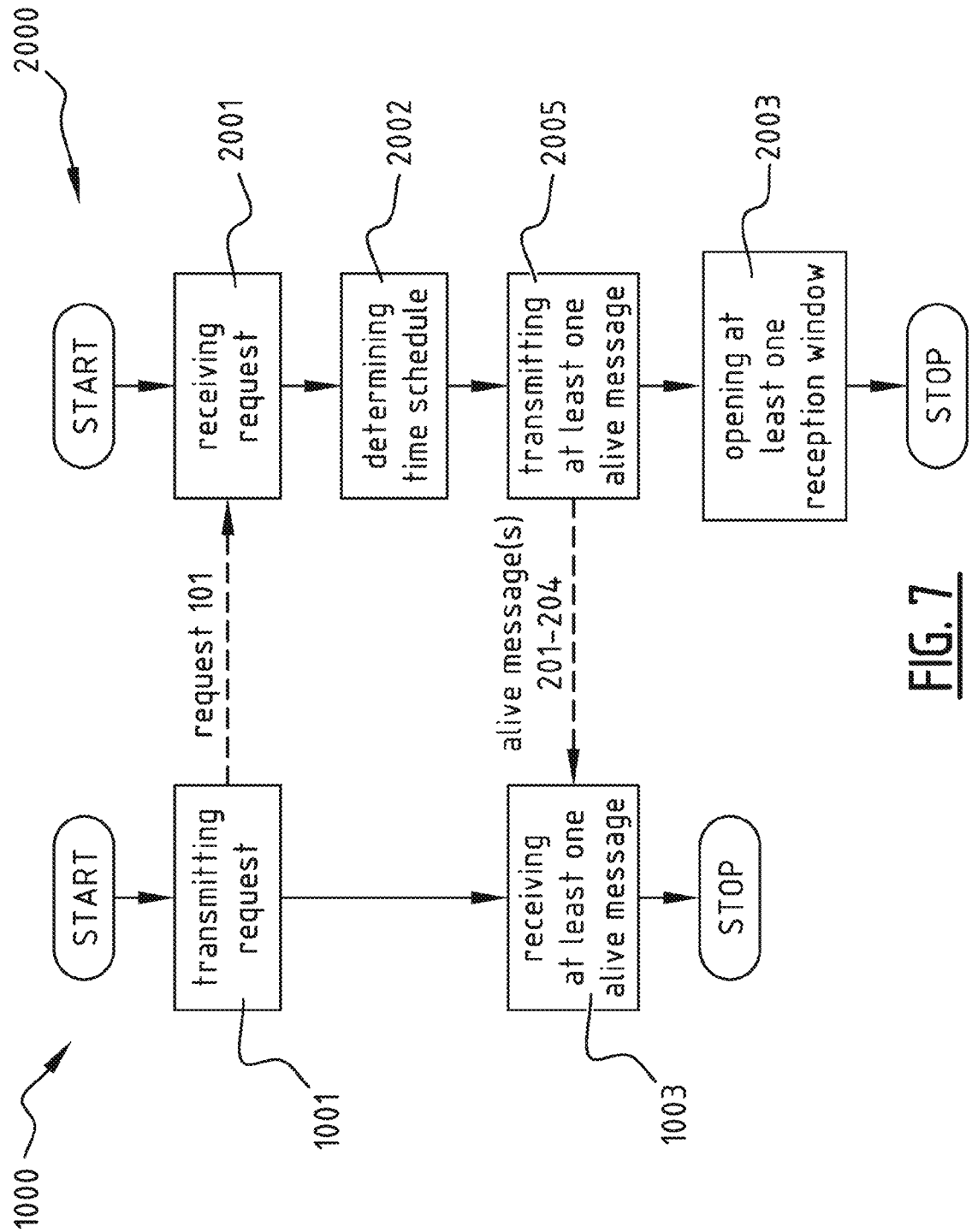
FIG. 7 schematically illustrates two embodiments of methods according to the present invention.

FIG. 7 schematically illustrates two embodiments of methods according to the present invention.

Method 1000, for controlling e.g. server 20 of FIG. 6, may comprise operation 1001, namely transmitting request 101 to device 10, with e.g. communication module 22, request 101 indicating at least one time condition, such that device 10 will, as a response to received request 101, open at least one reception window according to a time schedule based on the at least one time condition. Method 1000 may further comprise operation 1003, namely receiving transmitted at least one alive message 201-204, in particular at server 20. In a practical embodiment relating to LPWAN, each alive message of the at least one alive message 201-204 may comprise an empty packet, preferably of type Unconfirmed Data.

Method 2000, for controlling e.g. device 10 of FIG. 6, may comprise operation 2001, namely receiving request 101 from server 20, with e.g. communication module 12, and obtaining at least one time condition indicated by request 101; operation 2002, namely determining a time schedule based on the obtained at least one time condition; operation 2005, namely transmitting at least one alive message 201-204 to server 20, according to the determined time schedule; and operation 2003, namely opening at least one reception window of e.g. communication module 12 according to the determined time schedule.

Figure 8:
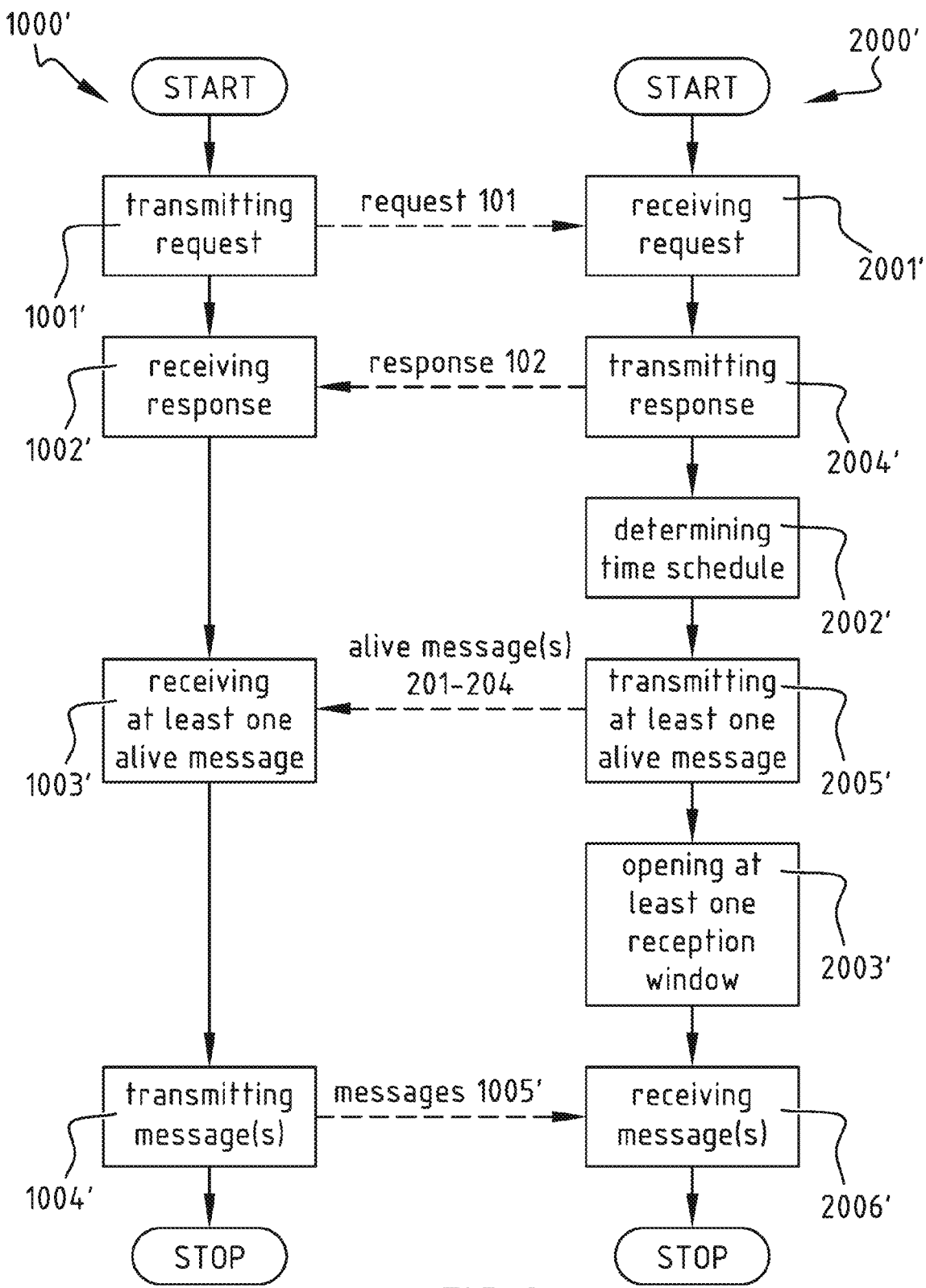
FIG. 8 schematically illustrates two embodiments of methods according to the present invention, e.g. further developments of the method embodiments shown in FIG. 7.

FIG. 8 schematically illustrates two embodiments of methods according to the present invention, e.g. further developments of the method embodiments shown in FIG. 7.

Method 1000', for controlling e.g. server 20 of FIG. 6, may comprise operation 1001', namely transmitting request 101 to device 10, with e.g. communication module 22, request 101 indicating at least one time condition, such that device 10 will, as a response to received request 101, open at least one reception window according to a time schedule based on the at least one time condition.

Method 2000', for controlling e.g. device 10 of FIG. 6, may comprise operation 2001', namely receiving request 101 from server 20, with e.g. communication module 12, and obtaining at least one time condition indicated by request 101.

Method 2000' may further comprise operation 2004', namely transmitting response 102 to received request 101, response 102 indicating confirmation or rejection of received request 101—in this particular example, a confirmation thereof may be assumed.

Method 1000' may further comprise receiving response 102 from device 10.

Method 2000' may further comprise operation 2002', namely determining a time schedule based on the obtained at least one time condition.

Method 2000' may further comprise operation 2005', namely transmitting at least one alive message 201-204 to server 20.

Method 1000' may further comprise operation 1003', namely receiving transmitted at least one alive message 201-204 at server 20. In a practical embodiment relating to LPWAN, each alive message of the at least one alive message 201-204 may comprise an empty packet, preferably of type Unconfirmed Data.

Method 2000' may further comprise operation 2003', namely opening at least one reception window of e.g. communication module 12 according to the determined time schedule. In a particularly preferred embodiment, each reception window of the at least one reception window may be opened as a direct consequence of transmitting each alive message of the at least one alive message 201-204.

Method 1000' may further comprise operation 1004', namely transmitting one or more messages 1005' (optionally including a command) to device 10, such that they are received by device 10 during one (or more) of the opened reception windows. To this end, method 1000' may optionally comprise an operation (not shown) of determining the same time schedule, to ensure synchronisation with reception windows opened via method 2000'.

Method 2000' may further comprise operation 2006', namely receiving the one or more messages 1005'.

In this manner, device 10 may be more interactive from the perspective of server 20.

In a further developed embodiment, method 2000' may optionally comprise controlling at least part of device 10 to sleep during at least one period separate from the opened at least one reception window, based on the determined time schedule. For example, device 10 may deactivate communication module 12, to prevent it from consuming power to maintain a reception window.

In this manner, device 10 may save power, to ensure longer battery lifetime.

Figure 9:
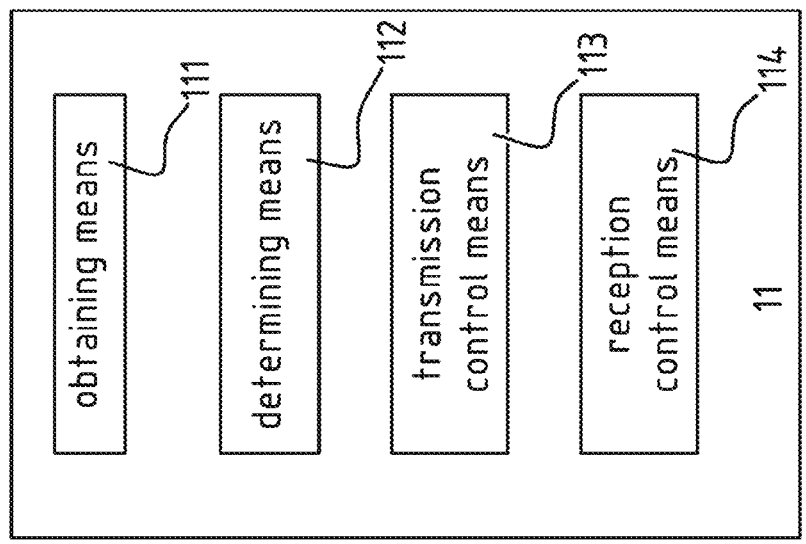
FIG. 9 schematically illustrates another embodiment of a controller according to the present invention.

FIG. 9 schematically illustrates another embodiment of a controller 11 according to the present invention. Controller 11 may be suitable for controlling a battery-powered device (not shown), e.g. device 10 of FIG. 6, the device comprising a communication module configured for communicating with a server (not shown), e.g. server 20 of FIG. 10. Controller 11 may comprise obtaining means 111 configured for obtaining at least one time condition indicated by a request received by communication module from the server. Controller 11 may also comprise determining means 112 configured for determining a time schedule based on the obtained at least one time condition. Controller 11 may also comprise transmission control means 113 configured for controlling the communication module for transmitting at least one alive message to the server according to the determined time schedule. Controller 11 may also comprise reception control means 114 configured for opening at least one reception window of the communication module according to the determined time schedule.

Analogous considerations and advantages may be applicable for controller 11 of FIG. 9 as for that of FIG. 6 and/or those of other embodiments disclosed in this specification.

Moreover, the skilled person will readily be able to devise practical forms for implementing the obtaining means 111, determining means 112, transmission control means 113, and reception control means 114. For example, one or more or all of these means may be provided by electronic hardware components that may be specifically pre-programmed to perform their respective functions or that may be arranged or otherwise adapted to perform those functions, or alternatively one or more or all of these means may be provided by programming their respective functionality into a general-purpose computing device, such that that general-purpose computing device may perform their functions. Alternatively, a combination of these two approaches may also be possible.

Figure 10:
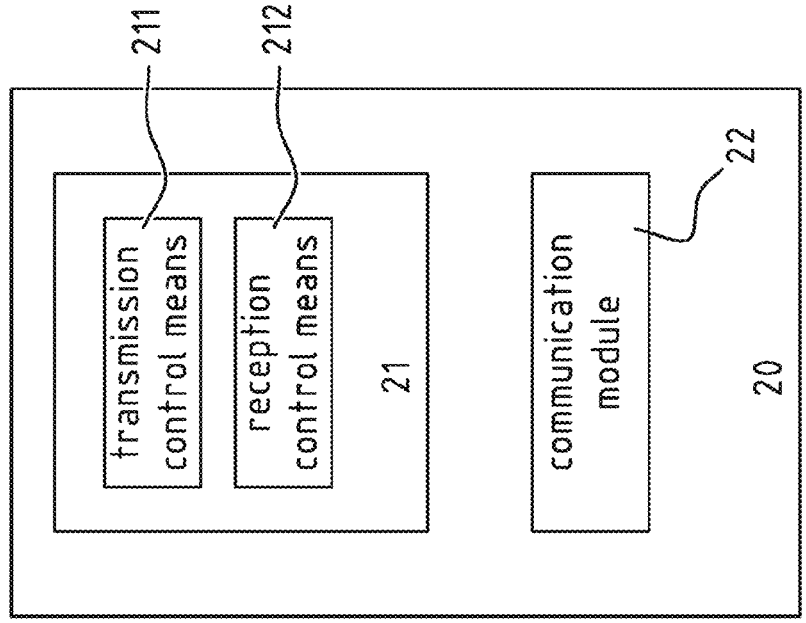
FIG. 10 schematically illustrates another embodiment of a server according to the present invention.

FIG. 10 schematically illustrates another embodiment of a server 20 according to the present invention. Server 20 may comprise communication module 22 and controller 21. Communication module 22 may be configured for communicating with a device (not shown), e.g. device 10 of FIG. 6. Controller 21 may comprise transmission control means 211 configured for controlling the communication module for transmitting a request to the device, the request indicating at least one time condition, such that the device will as a response to the received request, open at least one reception window according to a time schedule based on the at least one time condition. Controller 21 may further comprise reception control means 212 configured for controlling the communication module for receiving at least one alive message from the device.

Analogous considerations and advantages may be applicable for server 20 and controller 21 of FIG. 10 as for those of FIG. 6 and/or those of other embodiments disclosed in this specification.

Moreover, the skilled person will readily be able to devise practical forms for implementing the transmission control means 211 and the reception control means 212. For example, one or more or all of these means may be provided by electronic hardware components that may be specifically pre-programmed to perform their respective functions or that may be arranged or otherwise adapted to perform those functions, or alternatively one or more or all of these means may be provided by programming their respective functionality into a general-purpose computing device, such that that general-purpose computing device may perform their functions. Alternatively, a combination of these two approaches may also be possible.

Furthermore, other means than those specifically mentioned above may be provided analogously.

In summary, embodiments of the present invention may allow to only limitedly increase power consumption compared to other solutions. This may be quantified by considering a concrete case:

An LPWAN class A end device sends every 2 hours 1 packet with a payload of 100 bytes, with a spreading factor SF=10, a transmission TX current level of 50 mA, with packet Time-on-Air of 1.1 se. Considering a battery with a capacity of 2000 mAh, the calculated battery lifetime would then be around 13 years, taking into account a correction factor of 70% (covering extra power needed for retransmissions, commands/responses, . . . ).

For a controller, device or method according to the present invention, consider one stream per week, of 1 alive packet every 2 minutes during 2 hours, also with SF=10 and TX current of 50 mA, and with packet Time-on-Air of 0.29 sec. In this case, applying the same correction factor of 70%, the battery lifetime would still be around 11 years. In this scenario the end device operates for 1.19% of the time.

Compare this with the 'Temporary class A/C mode switching' case proposed in LPWAN technologies such as LoRa®/LoRaWAN™, wherein the end device operates also for 1.19% of the time in class C mode, and with all other parameters unchanged: in this case the battery lifetime (again with 70% correction factor) would only be 1.1 year, due to the continuously open receive window during 1.19% of the time.

Moreover, embodiments of the present invention allow a much higher flexibility for applying the method for shorter and longer durations. By making time interval T and/or number of times N sufficiently large, the duration of operating according to method embodiments of the present invention may be extended to longer periods, even in the order of weeks. The period may be even further extended by refreshing the command, as described above. In the extreme case, an end device according to the present invention may permanently operate in this manner, thus e.g. sending every 15 minutes an alive message during its entire lifetime. In that case the battery lifetime would still be around 3.5 years, which is far more than the 6 months for an end device operating permanently in class B mode.

Furthermore, embodiments of the present invention, using such regular reception of alive messages during a well-defined timeframe, allow the network server to monitor more closely the evolution of the radio network quality: gateways may register at each reception the RSSI (Received Signal Strength Indicator), the SNR (Signal-to-Noise Ratio) and the channel. By gathering such data for a well-defined subset of end devices during a certain period, the network server may obtain valuable data to analyze and optimize network operation.

Although the above description included consecutive pairs of reception slots for purposes of convenience with regard to existing standards, it is to be noted that consecutive single reception slots could also be used, or consecutive series of more than two reception slots, as well as any combinations thereof—e.g. first a single reception slot, next a pair of reception slots, then three reception slots, and then every time repeating the single reception slot, the pair of reception slots and the three reception slots.

Although the above description included empty packets of type Unconfirmed Data, as alive messages, such alive messages may instead carry payload, and may additionally or alternatively be packets of different types.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The program storage devices may be resident program storage devices or may be removable program storage devices, such as smart cards. The embodiments are also intended to cover computers programmed to perform said steps of the above-described methods.

The description and drawings merely illustrate the principles of the present invention. It will thus be appreciated that those skilled in the art will be able to devise various arrangements that, although not explicitly described or shown herein, embody the principles of the present invention and are included within its scope. Furthermore, all examples recited herein are principally intended expressly to be only for pedagogical purposes to aid the reader in understanding the principles of the present invention and the concepts contributed by the inventor(s) to furthering the art, and are to be construed as being without limitation to such specifically recited examples and conditions. Moreover, all statements herein reciting principles, aspects, and embodiments of the present invention, as well as specific examples thereof, are intended to encompass equivalents thereof.

The functions of the various elements shown in the figures, including any functional blocks labelled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the present invention. Similarly, it will be appreciated that any flowcharts, flow diagrams, state transition diagrams, pseudo code, and the like represent various processes which may be substantially represented in computer readable medium and so executed by a computer.

It should be noted that the above-mentioned embodiments illustrate rather than limit the present invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The present invention can be implemented by means of hardware comprising several distinct elements and by means of a suitably programmed computer. In claims enumerating several means, several of these means can be embodied by one and the same item of hardware. The usage of the words "first", "second", "third", etc. does not indicate any ordering or priority. These words are to be interpreted as names used for convenience.

In the present invention, expressions such as "comprise", "include", "have", "may comprise", "may include", or "may have" indicate existence of corresponding features but do not exclude existence of additional features.

Whilst the principles of the present invention have been set out above in connection with specific embodiments, it is to be understood that this description is merely made by way of example and not as a limitation of the scope of protection which is determined by the appended claims.

The invention claimed is:

1. A battery-powered device comprising:
   a battery arranged to power the device;
   a communication module configured to communicate with a server and for including receiving from the server a request indicating at least one time condition; and
   a controller to control the device, wherein the controller is configured to:
      obtain at least one time condition indicated by a request received by the communication module from the server;
      determine a time schedule based on the obtained at least one time condition;
      transmit at least one alive message to the server via the communication module according to the determined time schedule;
      open at least one reception window of the communication module according to the determined time schedule; and
      deactivate the communication module and a connection with the server outside of the at least one reception window according to the determined time schedule.

2. The device of claim 1, configured to control at least part of the device to sleep during at least one period separate from the at least one reception window, based on the determined time schedule.

3. The device of claim 1, configured to:
   control the communication module to transmit to the server a response to the received request, the response indicating confirmation or rejection of the received request; and
   determine the time schedule and open the at least one reception window when the response indicates confirmation of the received request.

4. The device of claim 1, configured to: open each reception window of the at least one reception window as a direct consequence of transmitting each alive message of the at least one alive message; and synchronize with the server via the alive message, when a timer or clock in the device is inaccurate.

5. The device of claim 1, wherein the at least one alive message comprises an empty packet of type Unconfirmed Data.

6. The device of claim 1, wherein the at least one time condition comprises at least one of the following:
   a number of times to open a reception window; and
   a time interval to wait to open each reception window.

7. The device of claim 6, wherein the at least one time condition comprises both the number of times and the time interval; and
   wherein the controller is configured to determine the time schedule as a linear repetition of the time interval for the number of times.

8. The device of claim 6, when the at least one time condition comprises the number of times,
   the controller configured to control the device to, if the number of times is zero, halt further opening of reception windows of the at least one reception window.

9. The device of claim 1, configured to:
   obtain a time delay to delay opening the at least one reception window, based on the request received by the communication module from the server, or to obtain the time delay from a memory storage configured for storing the time delay; and
   delay opening the at least one reception window according to the obtained time delay.

10. The device of claim 1, configured to operate as a sensor.

11. The device of claim 1, configured to operate as a wireless sensor node.

12. The device of claim 1, wherein the communication module comprises at least one of a radio-frequency antenna and means for optical communication.

13. A method for controlling a battery-powered device comprising a communication module configured for communicating with a server, comprising:
   obtaining at least one time condition indicated by a request received by the communication module from the server;
   determining a time schedule based on the obtained at least one time condition;
   transmitting at least one alive message to the server via the communication module according to the determined time schedule;
   opening at least one reception window of the communication module according to the determined time schedule; and
   deactivating the communication module and a connection with the server outside of the at least one reception window according to the determined time schedule.

14. The method of claim 13, comprising:
   controlling at least part of the device to sleep during at least one period separate from the at least one reception window, based on the determined time schedule.

15. The method of claim 13, comprising:
   controlling the communication module to transmit to the server a response to the received request, the response indicating confirmation or rejection of the received request; and
   determining the time schedule and opening the at least one reception window when the response indicates confirmation of the received request.

16. The method of claim 13, comprising:
   opening each reception window of the at least one reception window as a direct consequence of transmitting each alive message of the at least one alive message.

17. The method of claim 13, wherein the at least one time condition comprises at least one of the following:
   a number of times to open a reception window; and
   a time interval to wait to open each reception window.

18. The method of claim 17, wherein the at least one time condition comprises both the number of times and the time interval; and the method further comprises determining the time schedule as a linear repetition of the time interval for the number of times.

19. The method of claim 17, wherein the at least one time condition comprises the number of times, and if the number of times is zero, halting further opening of reception windows of the at least one reception window.

20. A non-transitory computer readable medium comprising program instructions for causing an apparatus to perform at least the following:

obtaining at least one time condition indicated by a request received by the communication module from the server;

determining a time schedule based on the obtained at least one time condition;

transmitting at least one alive message to the server via the communication module according to the determined time schedule;

opening at least one reception window of the communication module according to the determined time schedule; and deactivating the communication module and a connection with the server outside of the at least one reception window according to the determined time schedule.

* * * * *